United States Patent [19]

Doremus

[11] 4,132,521

[45] Jan. 2, 1979

[54] APPARATUS FOR FORMING AND POLISHING SOAP BILLETS

[75] Inventor: John F. Doremus, Central Valley, N.Y.

[73] Assignee: Avon Products, Inc., Suffern, N.Y.

[21] Appl. No.: 839,896

[22] Filed: Oct. 6, 1977

[51] Int. Cl.² .............................................. B29C 17/00
[52] U.S. Cl. ...................... 425/383; 425/94; 425/97; 425/107; 425/385; 425/378 R
[58] Field of Search ..................... 425/90, 93, 94, 107, 425/191, 383, 385, 378 R, 462, 97

[56] References Cited

U.S. PATENT DOCUMENTS

| | | | |
|---|---|---|---|
| 2,616,126 | 11/1952 | Merck et al. | 425/107 X |
| 2,713,188 | 7/1955 | Garvey | 425/191 |

Primary Examiner—J. Howard Flint, Jr.
Attorney, Agent, or Firm—Pennie & Edmonds

[57] ABSTRACT

An apparatus is disclosed for use in continuously and automatically forming a highly polished and lustrous surface on the exterior of an advancing billet of plastic material, such as soap, which emerges from the nozzle of an extrusion apparatus. The apparatus includes an enclosed reservoir containing a lubricating fluid that is compatible with the soap, so as to ensure a polished surface on the exterior surface of the soap. The apparatus embodies outlet means having a continuously smooth and generally tapered wall surface that defines an outlet opening for the cavity and is dimensioned and configured to be less than the cross-sectional dimension of the emerging soap by a predetermined amount so as to contact substantially the entire peripheral surface of the soap. In this manner, the wall surface gently wipes the fluid from the advancing billet surface and continuously presses its exterior surface so as to reduce the cross-sectional dimension by a predetermined amount which forms the highly polished and lustrous billet surface.

8 Claims, 4 Drawing Figures

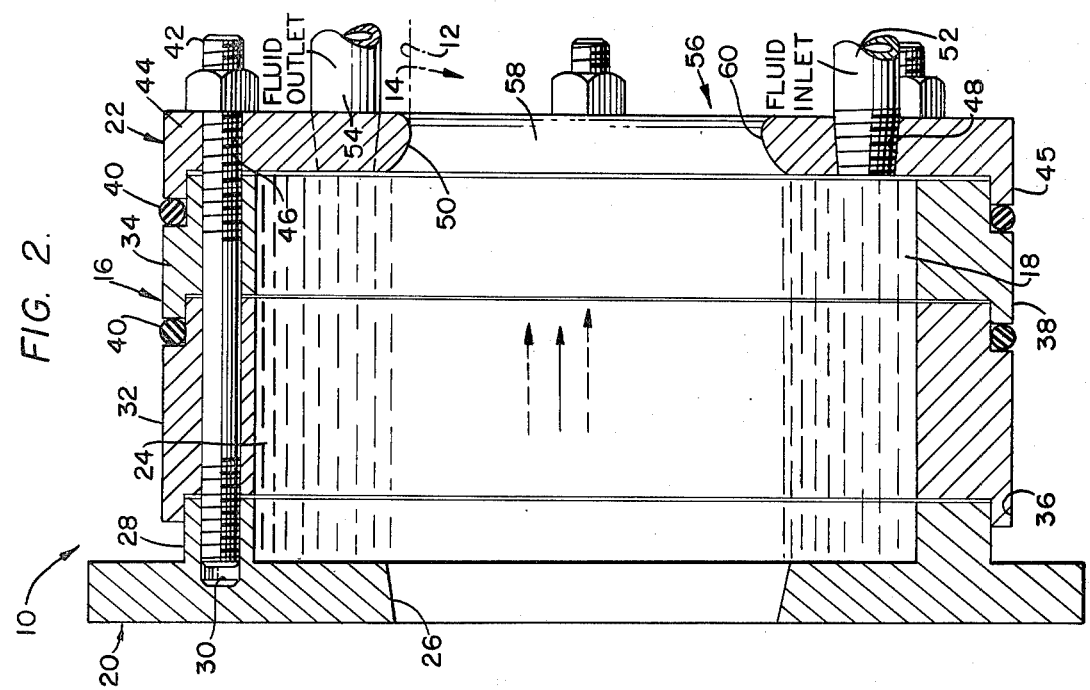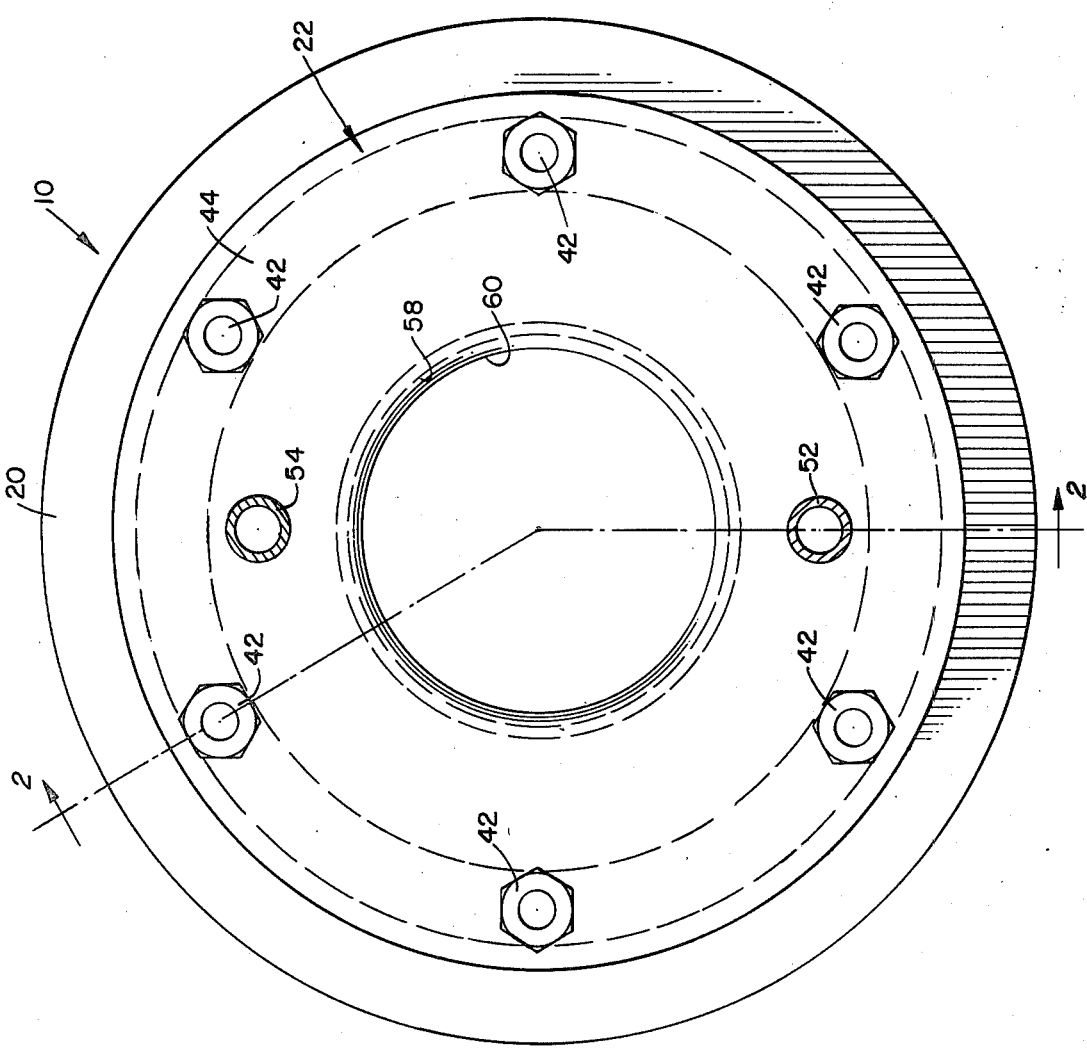

APPARATUS FOR FORMING AND POLISHING SOAP BILLETS

BACKGROUND OF THE INVENTION

1. Field of the Invention

In general, this particular invention relates to an apparatus for processing a plastic material to impart a highly lustrous and polished surface.

2. Brief Description of the Prior Art

In the typical soap manufacturing operation, a bar of milled soap is generally extruded from a nozzle and an apertured forming plate mounted at the end of the nozzle and transverse to the longitudinal axis of the extrusion device or plodder. Thereafter, the extruded soap is appropriately cut into blanks or billets. During the foregoing process, it is customary to have an apparatus for purposes of providing the extruded soap with a generally continuous and smooth outer surface which is free of surface impediments or impairments. The aforedescribed apparatus which finishes the smooth surface is limited in the sense that even though the generally coarser imperfections are removed, it is nonetheless rather dull and unattractive in appearance. The foregoing type of surface is a drawback whenever it is desirable to have soap cakes with a smooth and highly glossy surface. It should be evident, of course, that a smooth and glossy finish materially enhances the commercial success of the particular soap being marketed.

Attempts have heretofore been undertaken with respect to providing soap with such glossy surface. By way of general example, it has been known in the prior art to use manual techniques. Generally speaking, the glossy surface resulted from persons rubbing the soap in their hands. The manual technique suffers from several substantial drawbacks, particularly from the standpoint of mass production of a multiplicity of uniformly, highly polished soap bars.

By way of specific example, U.S. Pat. No. 2,713,188 to Garvey broadly describes a mechanized approach which achieves the formation of a polished surface. This approach likewise has drawbacks insofar as the apparatus employed for polishing the soap is rather complicated in construction and expensive to operate. For instance, the Garvey process requires use of preselected heaters subsequent to extrusion in order to achieve formation of such a surface since the apparatus is unable to satisfactorily polish the soap surface to the desired extent when the soap is not heated above a certain temperature upon extrusion.

From the preceding considerations, it is clear that known prior art techniques in the field of soap manufacture fail to provide an apparatus which serves to simply, reliably, uniformly and economically produce highly polished surfaces on the exterior surface of extruded soap.

SUMMARY OF THE INVENTION

It is an object of the present invention to overcome the aforedescribed deficiencies associated with prior art attempts to reliably and inexpensively form extruded soap materials with a polished and highly lustrous surface which is free of surface imperfections.

Broadly, in accordance with the spirit and scope of this particular invention, an apparatus is disclosed which is adapted for use in continuously and automatically forming a highly polished and lustrous surface on the exterior surface of an advancing billet of plastic material, such as soap, which emerges from the nozzle of an extrusion apparatus. The apparatus embodies first means operatively communicating with an extrusion nozzle such that it is in communication with and receives therethrough an advancing soap billet exiting from the nozzle. This first means has at least generally opposed inlet and outlet portion means and a closed cavity forming a reservoir therebetween. The inlet means defines an opening enabling the advancing billet to enter the cavity. A lubricating fluid which is compatible with the soap, so as to ensure a polished surface, is present in the reservoir about the advancing soap billet for lubricating the exterior surface of the soap. The outlet means has a continuously smooth and generally tapered wall surface that defines an outlet opening for the cavity. The opening defined by the tapered wall surface is dimensioned and configured to be less than the cross-sectional dimension of the emerging soap such that the tapered wall surface contacts substantially the entire peripheral surface. Accordingly, the outlet opening wall surface gently wipes the lubricating fluid from the advancing billet surface and continuously presses its exterior surface so as to reduce the cross-sectional dimension by a predetermined amount which forms the highly polished and lustrous billet surface.

BRIEF DESCRIPTION OF THE DRAWINGS

The above and other objects, features and advantages of the present invention become readily apparent after reading a detailed description thereof when viewed in conjunction with the accompanying drawings.

FIG. 1 is a front elevational view depicting the polishing apparatus embodying the principles of the present invention;

FIG. 2 is a cross-sectional view taken substantially along the section line 2—2 appearing in FIG. 1, looking in the direction of the arrows, and illustrating the operation of such polishing apparatus on an advancing soap billet;

DETAILED DESCRIPTION

Figure 4:
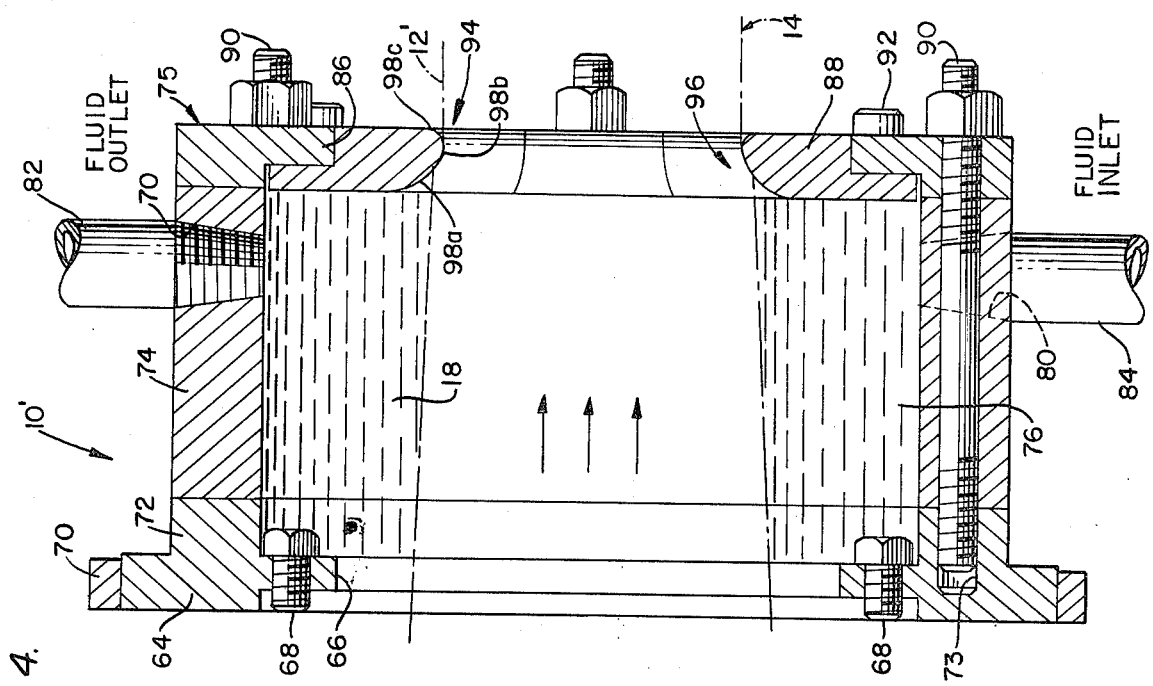
FIG. 4 is a cross-sectional view taken substantially along the section line 3—3 appearing in FIG. 3, looking in the direction of the arrows, and illustrating the operation of such polishing apparatus on an advancing soap billet.

Referring now to the drawings and, in particular, to FIGS. 1 and 2, there is illustrated a preferred embodiment of the polishing apparatus of the instant invention which is being designated generally by reference numeral 10. As will be subsequently set forth in the succeeding description, the polishing apparatus 10 enables the continuous and automatic polishing of the exterior surface 12 of a soap billet 14, shown in phantom lines. It will be understood that the soap billet 14 exits, under pressure, from a soap extruder or plodder having an extrusion nozzle (not shown). Insofar as the present invention contemplates use in conjunction with any of the known types of soap extruders, details of such extruders have not been given since they do not form an aspect of the invention and the general structure and function thereof are well-known. Furthermore, while the present description focuses upon soap billets, it should be made clear that other types of compressible, plastic materials having similar characteristics and capable of being polished are contemplated.

As perhaps best illustrated in FIG. 2, the apparatus 10 is essentially defined by housing 16, and soap billet lubricating fluid 18. The housing 16 includes inlet plate means 20, outlet plate means 22 and lubricant chamber or reservoir 24. Inlet plate 20 has a central opening 26 therethrough which is in direct open communication with the extruder nozzle. The emerging soap billet 14 advances along the predetermined longitudinal path. Opening 26 is defined by tapered walls which gradually diverge from outside to inside and have a tendency to reduce friction forces on the soap billet 14, as it initially enters housing 16. Plate member 20 has formed thereon an annular securing boss 28 having inwardly threaded openings 30. The inlet plate 20 may be connected, in any suitable manner, to the exterior nozzle.

In the illustrated embodiment, housing 16 also comprises a pair of inner and outer, coaxially arranged and interfitting cylindrical housing components 32 and 34, respectively. Inner housing component 32 has an annular end ledge 36 which is sized to slidably fit over the radially outer surface of securing boss 28, whereas housing component 34 is formed with ledge 38 that slidably fits upon the outer annular stepped surface of inner component 32. Both components 32 and 34 are separable from each other and are constructed and dimensioned to snugly fit together. Other housing components similar in construction and being interchangeable are intended to be used. To ensure fluid-tightness, a pair of conventional sealing members, such as O-rings 40 may be employed about the seams between the inner and outer housing components 32 and 34, respectively, such as shown in FIG. 2. Although not shown, a similar O-ring can be seated between the inlet plate 20 and inner housing component 32.

A multiplicity of circumferentially spaced apart bolts 42 are threadedly engageable with openings 30 and serve to interconnect the inlet and outlet plates 20 and 22 to the housing components 32 and 34. When the aforementioned structure is assembled, it defines the noted enclosed chamber or reservoir 24 which receives and contains the lubricating fluid 18.

Referring back again to the outlet plate 22, it is envisaged as being replaceable. In this particular manner, versatility in the field is greatly enhanced since other outlet plates with openings having different sizes and shapes can be used. In the embodiment presently being described, however, the outlet plate 22 is shaped in the form of a separable end cap 44 having flange 45 which slidably interfits with and overlaps the outer annular stepped surface of outer housing component 34. The end cap 44 whenever in the assembled position acts to compress gasket 40. End cap 44 is also formed with openings 46 which cooperate with and correspond in number to the number of fastening bolts 42. A pair of inlet and outlet fluid ports 48 and 50, respectively, are formed in end cap 44. Port 48 is connected to a fluid line 52 which serves to enable lubricant 18 to enter and fill that part of chamber 24 which surrounds the advancing billet 14 for purposes subsequently made evident. Another fluid line 54 is appropriately connected to port opening 50. By reason of this arrangement, lubricant 18 can be continuously circulated through chamber 24. In general, chamber 24 is enclosed so as to prevent air causing lathering as the soap passes through chamber 24. To drain lubricant 18, after a period of use, fluid line 52 connectable to a suitable drainage means, for example, can ensure removal thereof from chamber 24.

With continued reference to FIG. 2, outlet cap 44 has a central and circular polishing opening 56 with continuously smooth and, preferably, polished wall surface means 58. The tapered wall surface 58 is generally convergent to the apex 60 and then is gradually divergent as it approaches the outer surface of outlet plate 26. It is significant that the wall surface 58 defining the opening gently and continuously presses the exterior surface 12. By pressing elastic soap billet 14 radially inwardly, a predetermined slight amount, the cross-sectional dimension is reduced by a predetermined amount. This pedetermined amount is selected to ensure a highly polished and glistening surface. In this polishing stage, tapered wall surface 58 simultaneously functions to gently wipe the lubricant 18 from the soap billet surface 12. In practice, it has been determined that apex 60 of opening 56 should be so sized as to reduce the diameter of the billet 14 by no more than a few thousandths of an inch. Preferably, a reduction of the diameter of the soap billet in the order of about 0.003 inch or less has proved extremely successful and reliable. Since the outlet 22 can be replaced, it is clear the present structure offers significant versatility insofar as openings having other than circular may be provided. In the situation wherein opening 56 is polygonal, each side of the opening at the apex should compress and reduce the cross-sectional area by an amount which does not exceed the predetermined dimension capable of providing a highly polished and lustrous surface. Again, the reduction of billet dimensions exiting the outlet opening 56 should be in the order of a few thousandths of an inch. Although reduction in diametrically opposed surfaces has been indicated as being less than 0.003 inch, it is clear that such reduction can be in excess of 0.003 inch so long as a highly polished surface emerges.

Lubricating means 18 is selected primarily for purposes of appreciably minimizing friction forces on the advancing billet 14 as the latter travels through housing 16. Lubricant 18 should be compatible with the particular soap formulation of billet 14. In other words, lubricant 18 should not adversely affect the soap's finish or function. In this latter regard, for instance, silicone would be unacceptable since although it reduces friction it detrimentally affects the soap compositions for the purposes intended. Depending upon the formulation and properties of the soap or material being extruded, the following lubricating or treatment materials may be suitable: air, steam, hot or cold water, water/salt, glycerine solution, SORBITOL TM solution, CARBOWAX TM solution, sugar solution, and even water solutions having therein the soap composition of the soap billet being advanced through. It being understood that the foregoing are only illustrative and should not be construed as limiting. In this embodiment, the lubricant 18 is a solution of the particular soap composition of the billet. Such a solution is inexpensive and highly successful.

After having explained the foregoing construction and arrangement of components forming the polishing apparatus 10, it is believed that the operation thereof is self-evident. However, to supplement such description, the following will describe the advantageous, economical, automatic and continuous polishing function that is achievable.

The soap billet 14 which exits from an extruder nozzle advances along the direction of the arrows and enters into and through central opening 26. Thereafer, it intimately contacts lubricant 18 housed in enclosed reservoir 24. It will be appreciated, of course, that the lubricant solution 18 is generally added to the housing 16 after the leading end of cylindrical soap billet 14 passes through the outlet plate 22. In this fashion, the lubricant solution 18 may substantially fill the space remaining in reservoir 24. As earlier mentioned, the lubricant 18 reduces friction on the advancing soap billet 14. As noted, such solution is selected so as to not adversely affect the surface and/or appearance of the soap. Accordingly, lubricating solution 18 is selected so as to be compatible with the soap passing therethrough.

The tapered wall surface 58 which defines the outlet opening 56 is continuously smooth and, preferably, polished. The particular dimension between diametrically opposed sides of the apex 60 are selected to ensure that the exterior surface 12 of the billet 14 is substantially peripherally contacted such that as the soap continues to advance it is gradually compressed. As a consequence, the cross-sectional dimension of the billet is proportionately reduced. Generally, the present embodiment prefers that such reduction be in the order of about 0.003 inch or less. It is also appreciated, of course, that outlet opening 56 serves to shape the particular cross-sectional configuration of the soap billet as well as produce a highly polished surface. In this regard, the amount of reduction is also significant to gently wipe the solution 18 from the exterior surface 14 while simultaneously protecting against undesired leakage of lubricant from opening 56.

It has been found in the field that by passing the soap billet 14 through apparatus 10, as above described, there is a tendency for a soapy type of residue or shavings to accumulate within reservoir 24 notwithstanding the slight amount of pressure applied and reduction of cross-sectional dimension. In accordance with the present invention, should it be desired to change the external configuration of the soap billet 14 emerging from the apparatus 10, the outlet plate 22 can be replaced. Towards that end, fastening nuts on studs 42 are removed freeing outlet plate 22 and the housing components 32 and 34. Such removal may occur after the lubricant 18 has been removed from the chamber 24. Thereafter, another outlet plate 22 having a differently shaped and sized outlet opening may be assembled to the inlet plate 20 through the joinable and interchangeable housing components 32 and 34. The removable end cap 44 serves to facilitate cleaning of the soap build-up in the interior of the chamber 24. It is clear that apparatus 10 is able to achieve a highly polished finish on a soap bar in a continuous and automatic manner without the necessity of using, for example, complicated and expensive devices such as heating appliances and the like which have been heretofore described in the prior art. Consequently, apparatus 10 is able to achieve significant production output without incurring detrimental results to the soap surface.

Figure 3:
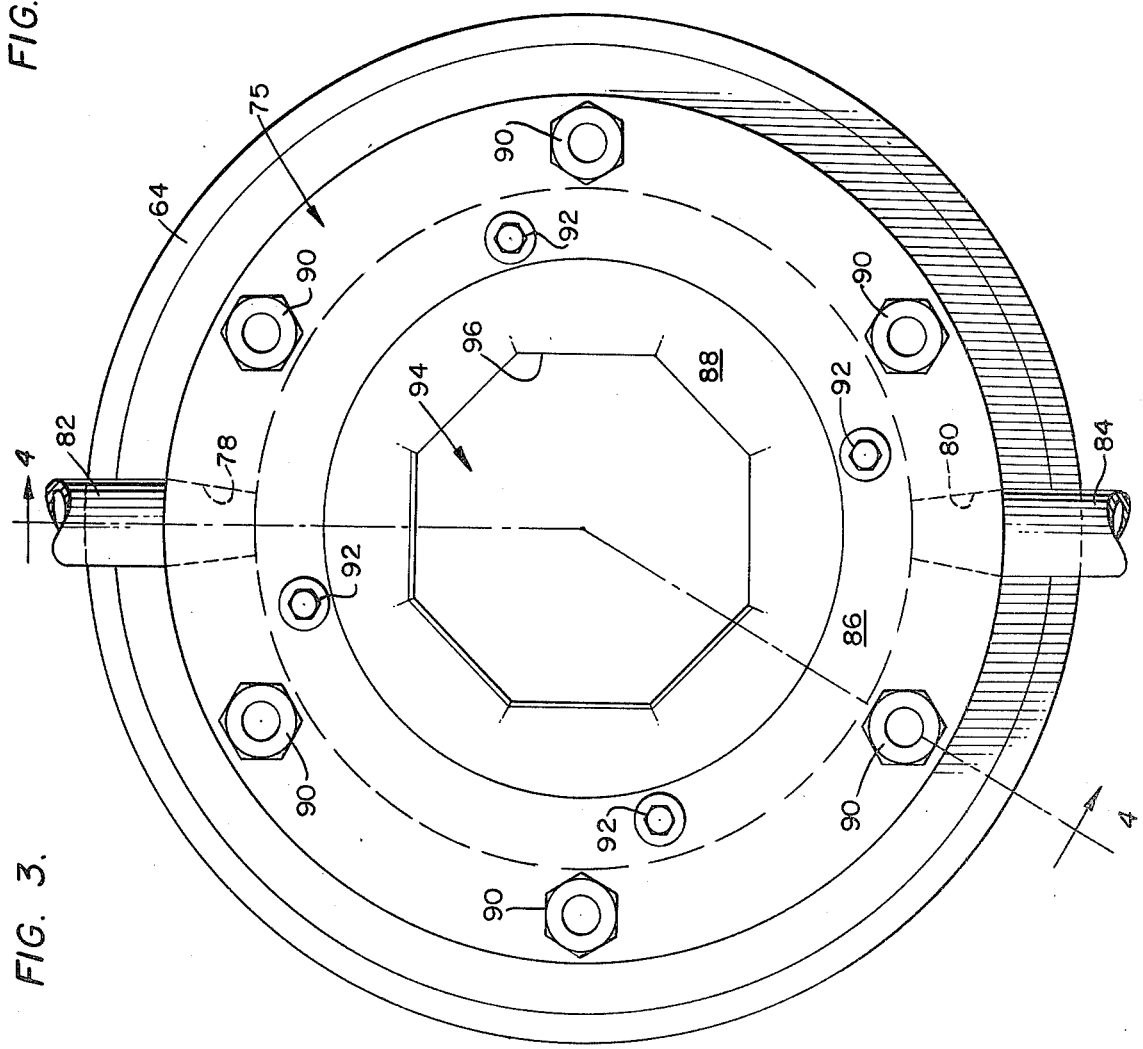
FIG. 3 is a front elevational view of another embodiment of this invention.

Now referring to FIGS. 3 and 4, there is disclosed another embodiment, as contemplated by the principles of the present invention, and is designated generally by reference numeral 10'. It will be understood that this particular embodiment also serves to continuously and automatically form a highly polished and lustrous finish to the exterior surface 12 of an advancing soap billet.

In the particular embodiment under consideration, an inlet plate 64 is formed with a generally centrally formed opening 66. Opening 66 is adapted to be in direct and open communication with an extrusion nozzle, which is not shown. The opening 66 is sufficiently dimensioned to permit the soap billet 14 to pass in an unobstructed manner. Threaded bolts 68 connect the plate adjacent the extruder nozzle to inlet plate 64. Although a radical clearance is shown existing between the exterior surface 12 of the billet 14 and the walls defining the opening 66, it will be understood that lubricating fluid 18 will not flow exteriorly of the forming and polishing apparatus 10'. This is so by reason of the fact the extruder nozzle housing or plate (not shown) blocks such lubricant flow. An adapting ring 70 circumferentially extends about the periphery of the inlet plate 64 and serves to, inter alia, adequately secure the inlet plate 64 in its proper position. An annular depending boss 72 is formed with a plurality of threaded apertures 73.

In the assembled condition, inlet plate 64 is connected to a generally cylindrical housing member 74 which is dimensioned and configured to be in cooperation with the inlet plate 64 and outlet means 75. Owing to this particular construction, a chamber 76 is formed which houses the lubricating solution 18.

Housing member 74 is formed with lubricant inlet and outlet openings 80 and 78 which are generally diametrically opposed to each other. Suitably connected to inlet and outlet openings 80 and 78 are corresponding lubricant lines 84 and 82, respectively. It will be appreciated that lubricant 18 is introduced into the chamber 76, and as earlier mentioned it may be compatible with the formulation of the advancing soap billet 14.

The outlet means 75 is formed by an outlet ring 86 and an outlet insert 88. The outlet ring 86 is fixedly connected to the housing member 74 which is, in turn, fixedly attached to the annular boss 72 by a plurality of circumferentially spaced and threaded fastening bolts 90. The outlet ring 86 and outlet insert 88 are fixedly connected to each other by virtue of another plurality of threaded cap screw members 92. Outlet insert 88 has a centrally defined opening 94 for polishing the surface 12 of billet 14. Opening 94 has a polygonal configuration and is defined by a generally continuously smooth tapered wall surface or means 96 having a converging inner portion 98a, apex 98b and a portion 96c that diverges in the direction of the arrows. The outlet opening 94 essentially functions as the outlet opening 54. The apex 98b is appropriately dimensioned, as in the previously described embodiment, to reduce the cross-sectional dimension of the advancing soap billet 14 by a predetermined amount so as to form the highly polished and lustrous billet surface. Accordingly, the outlet opening 94 is dimensioned and configured to uniformly contact and compress substantially the entire exterior surface of the soap billet 14 so as to compress and reduce the cross-sectional dimension thereof by an amount which is sufficient to induce the desired polishing and finish sought on the soap billet. Towards this end, wall surface 96 and, in particular, apex 98b are dimensioned to reduce the cross-sectional dimension of the advancing soap billet. In addition, of course, the wall 96 serves to gently wipe solution 18 from the advancing soap billet while protecting against outside leakage.

It is believed by virtue of the foregoing description of an alternate embodiment, the operation thereof is readily understood.

As a result of the foregoing description of the present invention, it will be appreciated that there is provided an apparatus which may be readily adapted to the extruder to be in communication with the extruder nozzle of any of the known soap plodders. The device is extremely simple, reliable and efficient and achieves the desired polished finish in a rapid manner which exceeds that encountered with the known manual rubbing method and is less expensive and less complicated than other known devices wherein heating elements are used to provide controlled heating for the exterior surface of the soap billet.

While the invention has been described in connection with the preferred embodiment, it is not intended to limit the invention to the particular form set forth above, but, on the contrary, it is intended to cover such alternatives, modifications, and equivalents as may be included within the spirit and scope of the invention as defined by the appended claims.

I claim:

1. An apparatus adapted for continuously and automatically forming a highly polished and lustrous surface on the exterior surface of an advancing billet of soap which emerges from the nozzle of an extrusion apparatus, comprising in combination first means operatively communicating with the extrusion nozzle such that it is in direct communication with and receives therethrough an advancing soap billet exiting from the nozzle, said first means having at least opposed inlet and outlet portion means and a closed cavity forming a reservoir therebetween, the inlet means defining an opening enabling the advancing billet to enter the cavity; reservoir means containing a lubricant fluid compatible with the soap to ensure a polished surface about the advancing soap billet, the outlet means has a continuously smooth and generally tapered wall surface that defines an outlet opening for the cavity, which opening is dimensioned and configured to be less than the cross-sectional dimension of the emerging soap, such that the tapered wall surface contacts substantially the entire peripheral surface of the soap, and the outlet opening wall surface gently wipes the solution from the advancing billet surface and continuously presses its exterior surface so as to reduce the cross-sectional dimension and form the highly polished and lustrous billet surface.

2. The apparatus as set forth in claim 1 wherein the cavity is enclosed so as to inhibit lathering.

3. The apparatus as set forth in claim 1 wherein the outlet means is removably secured to the inlet means.

4. The apparatus as set forth in claim 3 wherein the outlet means is comprised of an outer annular cap member defining an opening and being operatively connected to the inlet means, and an outlet insert member releaseably connected to the cap member and being positionable within the opening of the cap member to define the tapered wall surface.

5. The apparatus as set forth in claim 1 wherein the tapered wall surface reduces the dimension of the soap billet across any diametrically opposed surface portions by about no more than 0.003 inches.

6. The apparatus as set forth in claim 3 wherein the first means includes fluid inlet and outlet openings.

7. The apparatus as set forth in claim 1 wherein the lubricating fluid is a solution comprising a soap formulation which is substantially identical to the soap formulation of the billet.

8. The apparatus as set forth in claim 3 wherein said first means includes a hollow housing member removably connected to and between the inlet and outlet means for defining a portion of the reservoir.

* * * * *